(12) United States Patent
Donofrio

(10) Patent No.: US 10,071,449 B1
(45) Date of Patent: Sep. 11, 2018

(54) IRRIGATION INSERTION TOOL AND METHOD

(71) Applicant: Paul Donofrio, Sarasota, FL (US)

(72) Inventor: Paul Donofrio, Sarasota, FL (US)

( * ) Notice: Subject to any disclaimer, the term of this patent is extended or adjusted under 35 U.S.C. 154(b) by 417 days.

(21) Appl. No.: 14/743,644

(22) Filed: Jun. 18, 2015

Related U.S. Application Data

(60) Provisional application No. 62/013,889, filed on Jun. 18, 2014, provisional application No. 62/091,354, filed on Dec. 12, 2014.

(51) Int. Cl.
| | | |
|---|---|---|
| *A01G 25/02* | (2006.01) | |
| *B23P 19/04* | (2006.01) | |
| *B25B 27/10* | (2006.01) | |
| *B26F 1/00* | (2006.01) | |
| *B05B 1/20* | (2006.01) | |

(52) U.S. Cl.
CPC ............ *B23P 19/04* (2013.01); *A01G 25/026* (2013.01); *B25B 27/10* (2013.01); *B26F 1/0015* (2013.01); *B05B 1/202* (2013.01); *Y10T 29/5116* (2015.01)

(58) Field of Classification Search
CPC ....... B23P 19/04; B25B 27/10; A01G 25/026; B26F 1/0015; B05B 1/202; Y10T 29/5116
See application file for complete search history.

(56) References Cited

U.S. PATENT DOCUMENTS

| | | | |
|---|---|---|---|
| 2,064,263 A | * | 12/1936 | Kiellar ............. E04D 1/22 52/554 |
| 5,177,846 A | | 1/1993 | Bryant |
| 5,722,142 A | | 3/1998 | Myers |
| 5,893,201 A | | 4/1999 | Myers |
| 6,381,821 B1 | | 5/2002 | Panyon, Jr. |
| 6,430,767 B1 | | 8/2002 | Ramos |
| 6,581,262 B1 | | 6/2003 | Myers |
| 6,901,643 B1 | | 6/2005 | Krasner et al. |
| 7,185,409 B1 | | 3/2007 | Myers |
| 7,946,010 B1 | | 5/2011 | Myers et al. |
| 2006/0248702 A1 | | 11/2006 | Nikolaidis et al. |
| 2011/0154578 A1 | | 6/2011 | Amouroux |

* cited by examiner

*Primary Examiner* — John C Hong
(74) *Attorney, Agent, or Firm* — Frijouf, Rust & Pyle, P.A.

(57) ABSTRACT

An irrigation insertion tool is disclosed for inserting an irrigation emitter into an irrigation tubing. The irrigation insertion tool comprises a primary lever including a primary fulcrum base coupling a primary handle and a primary jaw. A secondary lever includes a secondary fulcrum base coupling a secondary handle and a secondary jaw. A couple joins the primary fulcrum base and the secondary fulcrum base for defining a fulcrum. A tubing channel is in the primary jaw for receiving the irrigation tubing. An emitter socket is in the secondary jaw for receiving the irrigation emitter. The primary handle and the secondary handle converge for generating a mechanical advantage between the primary jaw and the secondary primary jaw. The primary jaw and the secondary jaw compress the irrigation tubing with the irrigation emitter and pierce the barb tube through the irrigation tubing.

19 Claims, 14 Drawing Sheets

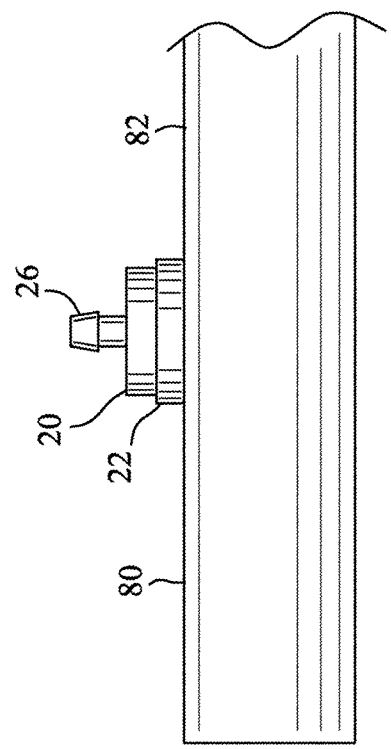
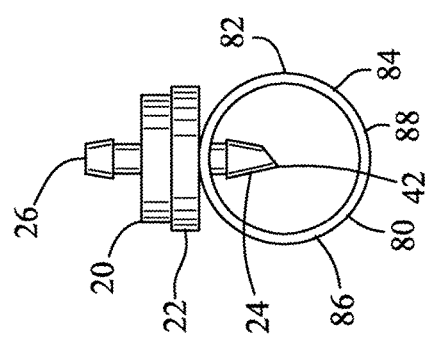
FIG. 17
FIG. 18

IRRIGATION INSERTION TOOL AND METHOD

CROSS-REFERENCE TO RELATED APPLICATIONS

This application claims benefit of U.S. Patent Provisional application No. 62/013,889 filed Jun. 18, 2014. All subject matter set forth in provisional application Ser. No. 62/013,889 is hereby incorporated by reference into the present application as if fully set forth herein.

This application claims benefit of U.S. Patent Provisional application No. 62/091,354 filed Dec. 12, 2014. All subject matter set forth in provisional application Ser. No. 62/091,354 is hereby incorporated by reference into the present application as if fully set forth herein.

BACKGROUND OF THE INVENTION

Field of the Invention

This invention relates to a tool device and more particularly to an irrigation insertion tool and method.

Background of the Invention

Irrigation is the artificial application of water to plants. Man has utilized various irrigation systems for over 5000 years. Many irrigation systems have evolved, including surface and localized irrigation systems as well as subsurface textile irrigation and in more recent years, drip irrigation.

Drip system irrigation systems comprise tubing having drip emitters affixed to the tubing at intervals proximate the plants to be irrigated. These systems enable the irrigation efficiency to exceed 90%, whereas common sprinkler systems are typically 50-70% efficient. Drip systems may be configured to deliver water above, on or below the ground surface. This minimizes water loss due to run-off, wind and evaporation. Drip irrigation systems are particularly suited to odd shaped, narrow areas. These systems may be automated using AC or battery powered controllers.

These systems are typically assembled on site, since the exact placement of the drip emitters is dependant upon placement of the plants to be irrigated. The assembly typically comprises puncturing the tubing at the desired emitter location followed by insertion of the drip emitter.

There have been several devices in the prior art designed to assist the practitioner in the installation of the drip emitters. Puncturing the relatively flexible tubing causes the tubing to become deformed and flattened which may result in a distorted or misplaced puncture. The insertion of the emitter in the previously punctured tubing in a second step completes the assembly for a single drip location. There is wide variety of devices in the marketplace which assist the user in the installation of drip emitters, as is well known to those skilled in the art. A simple single step device to precisely locate a drip emitter in the drip irrigation tubing remains an unsolved problem and a desirable addition to the art There have been many in the prior art who have attempted to solve these problems with varying degrees of success. None, however completely satisfies the requirements for a complete solution to the aforestated problem. The following U. S. Patents are attempts of the prior art to solve this problem.

U.S. Pat. No. 5,177,846 to Bryant discloses a hand held insertion tool formed from a single piece of material, having a comfortable gripping portion and an irrigation fitting holding portion. The fitting holding portion includes an elongated hollow central portion and a pair of stepped, slotted openings along one side thereof for releasably holding a fitting therein, whereby the insertion tool may accurately place and then insert the fitting into a water supply means.

U.S. Pat. No. 5,722,142 to Myers discloses a tool for installing irrigation barb emitters in irrigation tubing. The tool comprises a cradle member and a barb holder member arranged in crossed relation and connected intermediate their ends at a pivot. The cradle member and the barb holder member have a cradle handle and a barb holder handle, respectively, extending rearwardly from the pivot. The cradle member and the barb holder member have a cradle jaw and a barb holder jaw, respectively, extending forwardly from the pivot. A cradle is mounted at the end of the cradle jaw which receives a peripheral portion of an irrigation tubing. A barb holder is mounted at the end of the barb holder jaw directly opposite the cradle. The barb holder is a hollow cylinder having an axis aligned with the cradle which releasably receives a barb emitter. A shoulder within the hollow cylinder acts against an annular disk shoulder on the barb emitter to force a piercing point on the barb emitter to penetrate the periphery of the irrigation tubing held within the cradle when the cradle jaw and the barb holder jaw are brought together.

U.S. Pat. No. 5,893,201 to Myers discloses a tool for use in installing irrigation barb emitters in irrigation tubing. The tool comprises a cradle member having a cradle handle and a cradle jaw on opposing ends and a barb holder member having a barb holder handle and a barb holder jaw on opposing ends. The cradle member and the barb holder member are arranged in crossed relation. A cradle mounted on the cradle jaw is suitable for receiving a peripheral portion of an irrigation tubing. A barb holder mounted on the barb holder jaw is a hollow cylindrical cavity formed by two opposing barb holder jaw members. The barb holder has an axis aligned with the cradle with the opposing barb holder jaw members forming a slot opening therebetween. The slot opening is sized to allow snap fitting of the hollow cylinder of a barb emitter laterally into the hollow cylindrical cavity. A shoulder is formed by the lower edges of the opposing jaw members and acts against an annular disk shoulder on a barb emitter to force a piercing point on the barb emitter to penetrate irrigation tubing held within the cradle when the cradle jaw and the barb holder jaw are brought together. The barb emitter is released from the barb holder and retained within the irrigation tubing upon movement of the barb holder away from the cradle.

U.S. Pat. No. 6,381,821 to Panyon, Jr. discloses an emitter barb installation tool having a driving mechanism, emitter barb feeder magazine and pipe support. Pipe support holds and supports a pipe. Feeder magazine holds and feeds emitter barbs. Feeder magazine places one of the emitter barbs into a driving position. Driving mechanism drives the emitter barb from the driving position towards and into the pipe, held and supported by the pipe support. After the one barb has been driven into the pipe, the pipe with installed barb is released from the tool. Another emitter barb in the feeder magazine is then automatically located into the driving position for the next installation into a pipe. This installation process automatically and continuously repeats for insertion of additional emitter barbs. Individual emitter barbs are detachably coupled to one another to form an emitter barb cluster. Emitter barb installation tool is able to punch a starter hole into the pipe before the emitter barb is inserted into the pipe. Emitter barb installation tool either manually or electrically or pneumatically or hydraulically drives emitter barbs into a pipe. Emitter barb installation tool may have a cutter mechanism for cutting pipes. Emitter barb installation tool may also have removable jaw inserts to allow various sized pipes to be held and supported by pipe support.

U.S. Pat. No. 6,430,767 to Ramos, et al. discloses a tool that enables the forming of a hole in irrigation pipe, and the placement of an emitter device into that formed hole. includes a pair of elongate plier half-members connected at a pivoting joint. A first jaw includes an inwardly-directed hole punch member, while the second opposed jaw includes an inwardly-directed concavity to engage a piece of irrigation hose, such that closure of the jaws causes the hole punch to pierce a hole in the irrigation pipe. The jaw ends each include semi-cylindrical cavities sized to hold the cylindrical body of an emitter, to facilitate forcible insertion of the spike of the emitter into the hole previously formed in the irrigation pipe.

U.S. Pat. No. 6,581,262 to Myers discloses a tool for installing barb emitters in irrigation tubing. The tool has a cradle which receives irrigation tubing and a punch mounted opposite the cradle. The punch has a first cylinder and a second cylinder telescopically received within the first cylinder. The first cylinder has a cap at the upper end and an annular ring extending inwardly from to partially occlude the lower end. The second cylinder includes a second cap at the upper end which slidably engages the first cylinder and is resiliently urged by a spring against the annular ring. The cap has a punch holder extending downwardly therefrom. A needle has a sharp tip extending downwardly from the punch holder through the second cap to a point within the second cylinder when the spring is fully extended and beyond the second cylinder when the spring is fully compressed.

U.S. Pat. No. 6,901,643 to Krasner, et al. discloses a drip system tool similar to a pair of pliers with a piercing member and a retention member crossed in the center and rotatably fastened together. The piercing member has a handle with a gripping surface on one end and an inwardly projecting piercing pin on the opposite end. The retention member has a handle with a gripping surface on one end and an inwardly projecting arcuate retention hook on the opposite end. The retention hook is of a sufficient diameter to retain a piece of irrigation hose for the formation of a hole by the piercing pin. The retention member also features an axially oriented extension formed with a cylindrical socket for holding a conventional connector fitting for a drip irrigation system.

U.S. Pat. No. 7,185,409 to Myers discloses a tool for installing barb emitters in irrigation tubing. The tool has a cradle which receives irrigation tubing and a punch mounted opposite the cradle. The punch has a first cylinder and a second cylinder telescopically received within the first cylinder. The first cylinder has a cap at the upper end and an annular ring extending inwardly from to partially occlude the lower end. The second cylinder includes a second cap at the upper end which slidably engages the first cylinder and is resiliently urged by a spring against the annular ring. The cap has a punch holder extending downwardly therefrom. A needle has a sharp tip extending downwardly from the punch holder through the second cap to a point within the second cylinder when the spring is fully extended and beyond the second cylinder when the spring is fully compressed. One of the jaws has a knife blade extending from the other end thereof opposite. The jaws define a semi-circular concave anvil at the other end. The anvil has an axially extending slot therein which receives the cutting edge of said knife blade when the handles are closed together.

U.S. Pat. No. 7,946,010 to Myers, et al. discloses a tool for installing irrigation barb emitters into irrigation tubing including a cradle handle and a punch handle. The cradle handle and the punch handle are arranged in a parallel relation and connected intermediate their ends at a center point. A cradle which receives irrigation tubing is included. A punch pin allows a user to punch holes in irrigation tubing as desired with a spring loaded body which removes the punch pin when it has been driven into irrigation tubing. A barb holder allows a user to install emitter barbs into irrigation tubing as desired. A barb remover allows removal of barbs from irrigation tubing as desired.

United States Patent Application 2006/0248702 to Nikolaidis, et al. discloses a punch and insertion tool including an arm and a base that are integrally molded so as to constitute a single, continuous piece of plastic material. The arm supports an insertion shaft with an outermost sharp end so that the insertion shaft extends approximately transversely to the arm. The insertion shaft has a diameter and shape such that it will pass fully through the bore of a barbed tubular connector. The base includes means to hold a plastic tubing in a position opposing the insertion shaft so that the arm and the base can be pressed together in such a fashion that the arm will impinge any barbed tubular connector positioned on the shaft and push it with the shaft into an installed position in the wall of the plastic tubing tube.

United States Patent Application 2011/0154578 to Amouroux discloses a hand-operated pliers for piercing an irrigation pipe and fitting such an irrigation pipe with a drip emitter. These pliers comprise two jaws and a means for piercing the pipe as these two jaws are brought closer together. These pliers are characterized in that they further comprise a means for fitting a drip emitter onto the pierced pipe, and for doing so under the effect of the two jaws being brought closer together and with a view to fitting such a pipe with such a drip emitter.

Although the aforementioned prior art have contributed to the development of the art of drip irrigation systems, none of these prior art patents have solved the needs of this art.

Therefore, it is an object of the present invention to provide an improved device for the insertion of drip irrigation emitters into irrigation tubing.

Another object of this invention to provide an improved device for the single step puncture and emitter insertion of drip irrigation emitters into irrigation tubing.

Another object of this invention is to provide an improved device for the insertion of drip irrigation emitters into irrigation tubing which is easy for the operator to use.

Another object of this invention is to provide an improved device for the insertion of drip irrigation emitters into irrigation tubing that is easy to cost effectively produce.

The foregoing has outlined some of the more pertinent objects of the present invention. These objects should be construed as being merely illustrative of some of the more prominent features and applications of the invention. Many other beneficial results can be obtained by modifying the invention within the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved irrigation insertion tool. The irrigation insertion tool inserts an irrigation emitter into an irrigation tubing. The irrigation emitter has an emitter base coupling a barb tube and a discharge tube. The irrigation tubing has a circular cross-section defining a tubing diameter. The irrigation insertion tool comprises a primary lever including a primary fulcrum base coupling a primary handle and a primary jaw. A secondary lever includes a secondary fulcrum base coupling a secondary handle and a secondary jaw. A couple joins the primary fulcrum base and the secondary fulcrum base for defining a fulcrum. A tubing channel is in the primary jaw for receiving the irrigation tubing. An emitter socket is in the secondary jaw for receiving the irrigation emitter. The primary handle and the secondary handle converge for generating a mechanical advantage between converging primary jaw and secondary jaw. The primary jaw and the secondary jaw compress the irrigation tubing with the irrigation emitter and pierce the barb tube through the irrigation tubing.

In a more specific embodiment of the invention, the tubing channel defines a concave wall coupling a first linear wall and a second linear wall. The first linear wall and the second linear wall define a channel width. The channel width is less than the tubing diameter for compressing and elongating the irrigation tubing and preventing the irrigation tubing from collapsing inwardly during the barb tube being pierced through the irrigation emitter.

The invention is also incorporated into the method of inserting an irrigation emitter into an irrigation tubing. The method comprising the steps of inputting the irrigation tubing within a tubing channel of a primary jaw. The irrigation emitter is inputted within an emitter socket of a secondary jaw. The primary handle and a secondary handle converge for generating a mechanical advantage between converging primary jaw and secondary jaw. The irrigation tubing is compressed with the irrigation emitter and pierces the barb tube through the irrigation tubing.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which:

FIG. 17 is an enlarged view of a portion of FIG. 16, illustrating the irrigation emitter and the irrigation tubing after being removed from the tubing channel;
FIG. 18 is a right side view of FIG. 17.

Similar reference characters refer to similar parts throughout the several Figures of the drawings.

DETAILED DISCUSSION

Figure 1:
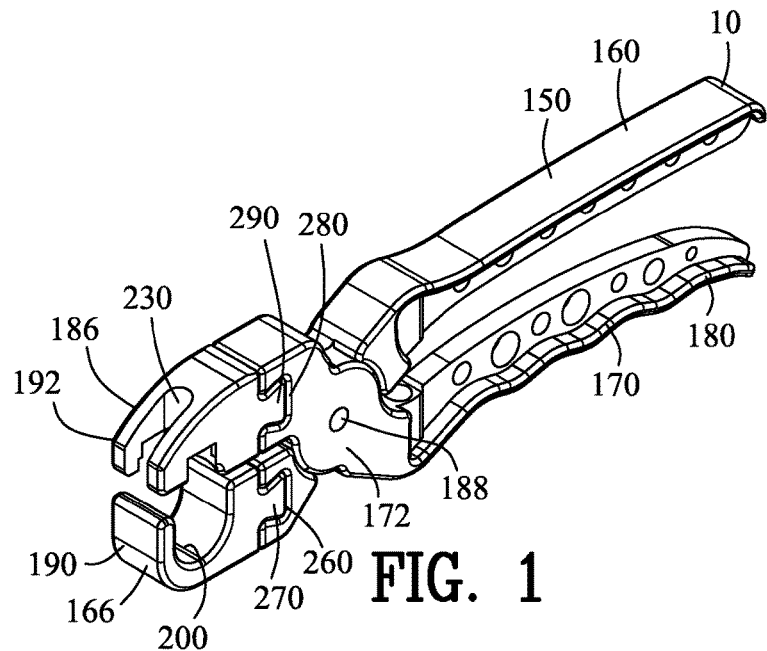
FIG. 1 is a front right isometric view of a irrigation insertion tool incorporating the present invention.
Figure 2:
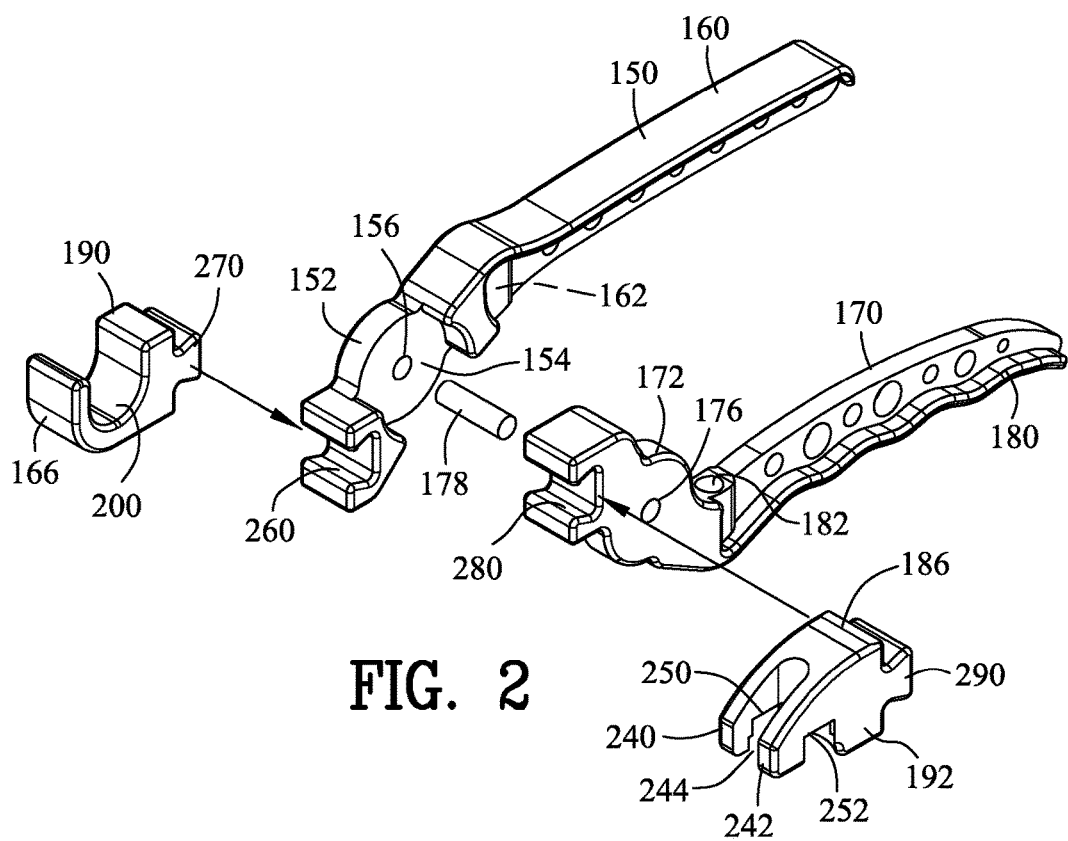
FIG. 2 is an exploded view of FIG. 1.
Figure 3:
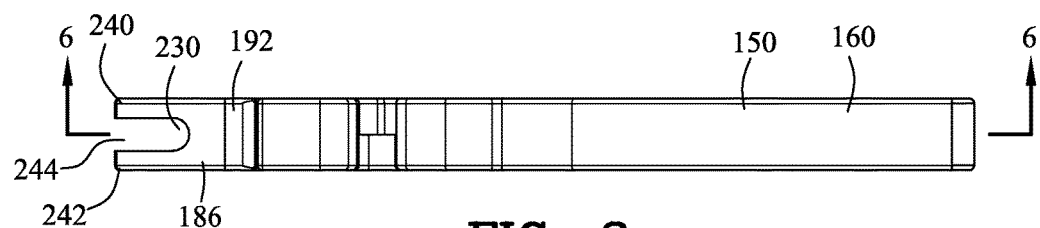
FIG. 3 is a top view of FIG. 1.
Figure 4:
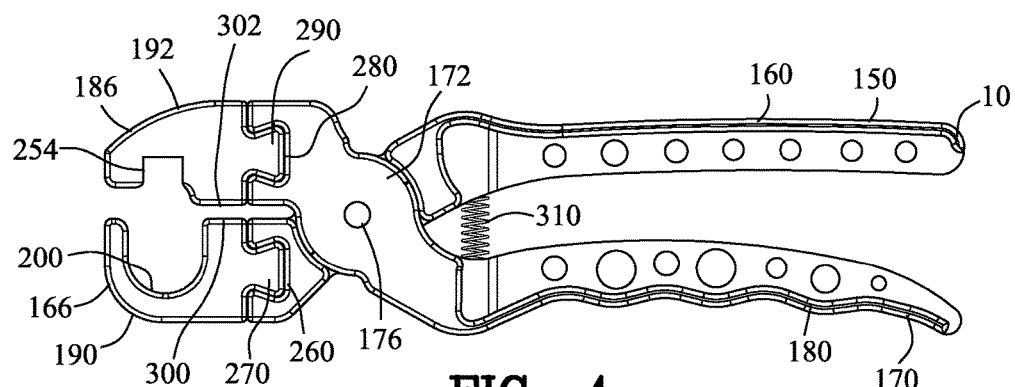
FIG. 4 is a right side view of FIG. 1.
Figure 5:
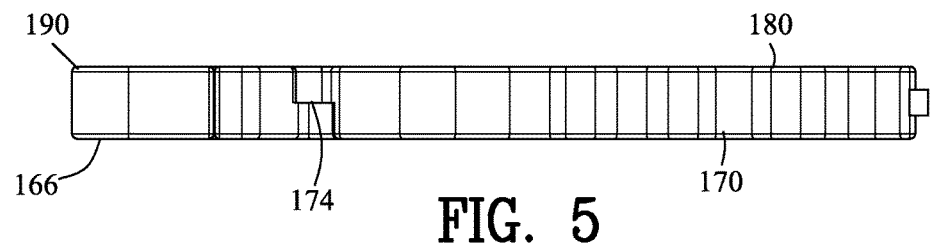
FIG. 5 is a bottom view of FIG. 1.
Figure 6:
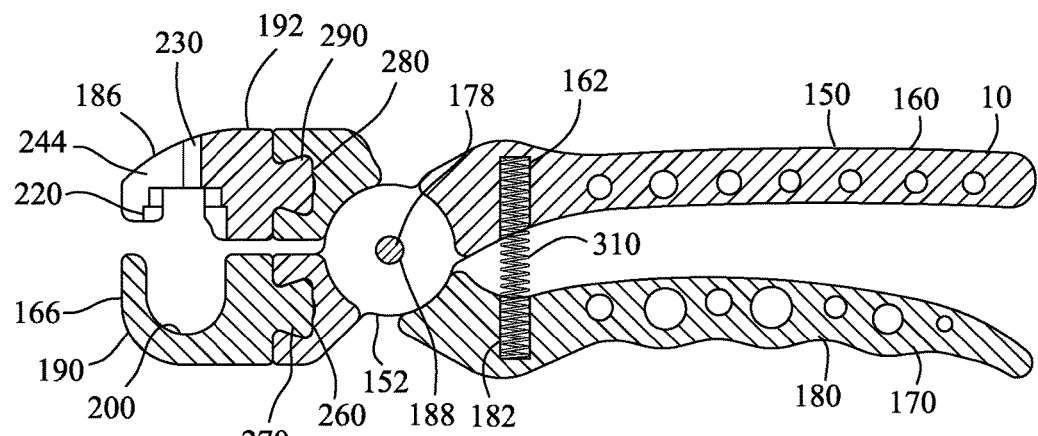
FIG. 6 is a sectional view along line 6-6 in FIG. 3.
Figure 7:
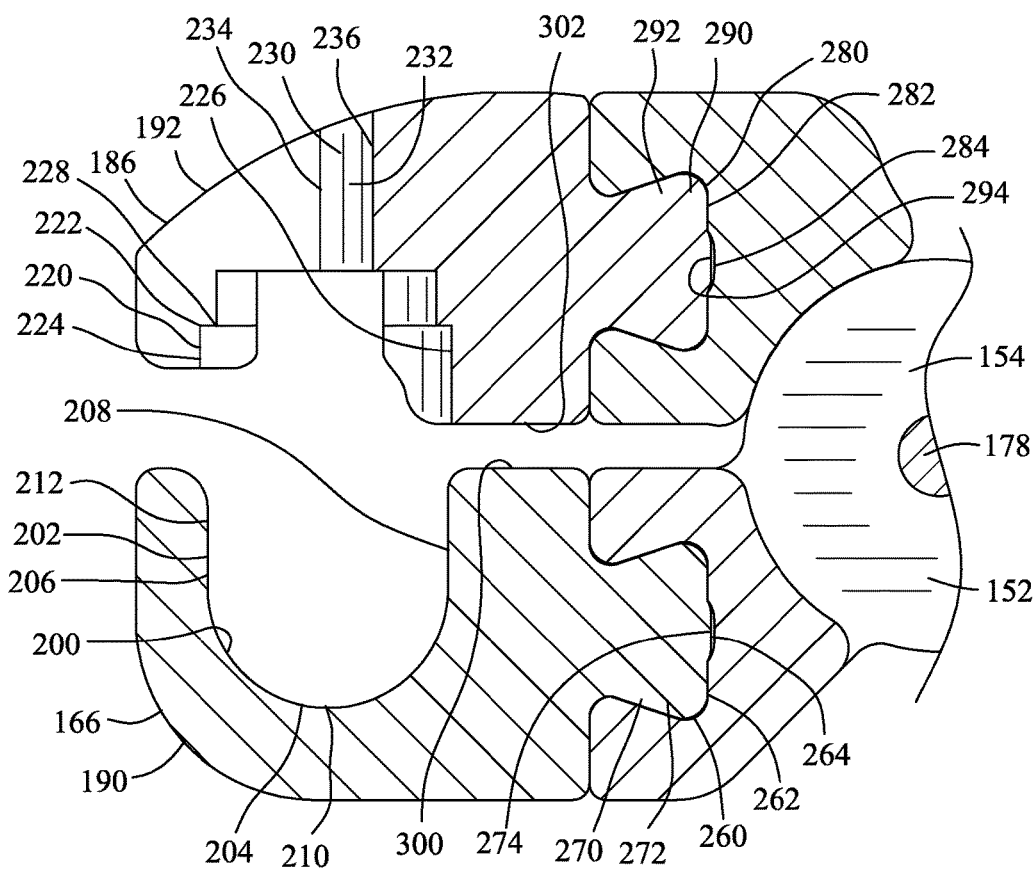
FIG. 7 is an enlarged portion of FIG. 6.
Figure 8:
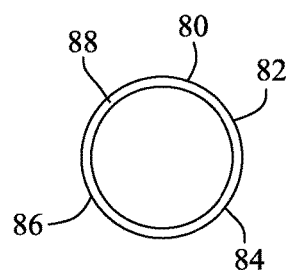
FIG. 8 is an end view of an irrigation tubing.
Figure 9:
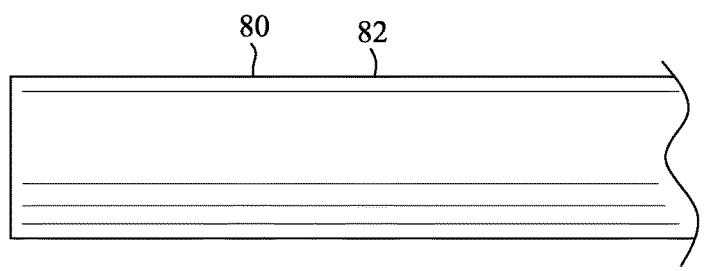
FIG. 9 is a side view of FIG. 8.
Figure 10:
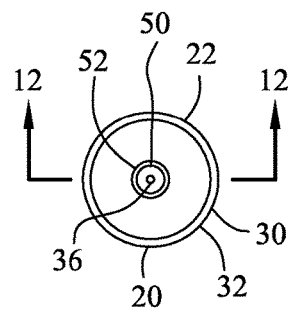
FIG. 10 is a top view of an irrigation emitter.
Figure 11:
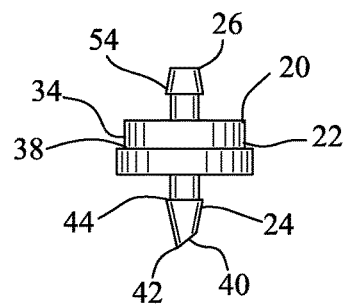
FIG. 11 is a front view of FIG. 10.

FIGS. 1-7, 13-16, 19-24, 31-35 and 38-40 illustrate an irrigation insertion tool 10 for inserting an irrigation emitter 20 into an irrigation tubing 80. FIGS. 10-18, 27-30 and 32-37, illustrate the irrigation emitter 20. The irrigation emitter 20 includes emitter base 22 coupling a barb tube 24 and a discharge tube 26. More specifically, FIGS. 10-18 illustrate an irrigation emitter 20 and FIGS. 27-30 and 32-37 illustrate a connector irrigation emitter 60. Both irrigation emitter 20 and connector irrigation emitter 60 include an emitter base 22, a barb tube 24 and a discharge tube 26. The barb tube 24 has a tapered surface 40 defining a piercing edge 42 for more easily traversing the irrigation tubing 80. In order to prevent the irrigation emitter 60 from being withdrawn from the irrigation tubing 80, the barb tube 24 includes a barb preventer lip 44. The discharge tube 26 irrigation emitter 20 and connector irrigation emitter 60 include a discharge tube circular cross-section 50 defining a discharge tube diameter 52 and a discharge tube height 54.

Figure 12:
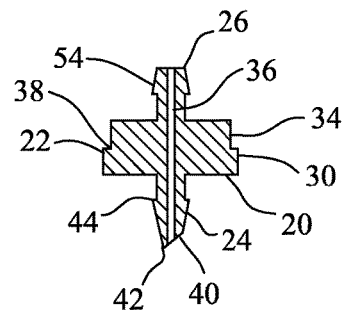
FIG. 12 is a sectional view along line 12-12 in FIG. 10.
Figure 13:
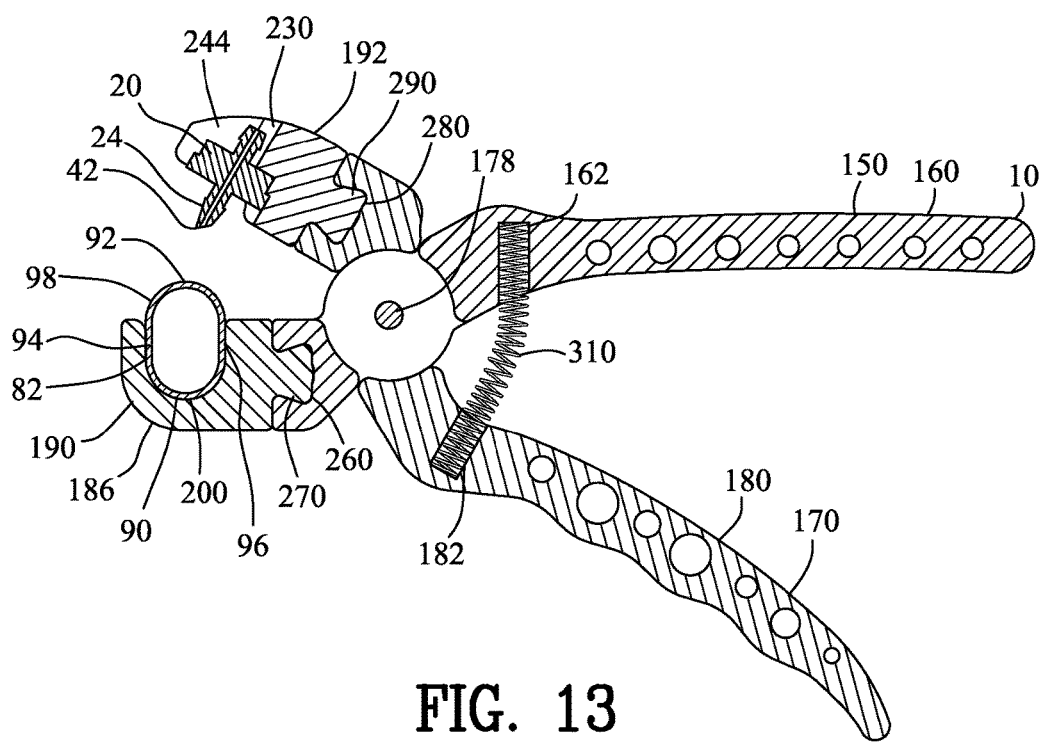
FIG. 13 is a view similar to FIG. 16, illustrating the irrigation tubing and the irrigation emitter engaging the irrigation insertion tool.
Figure 14:
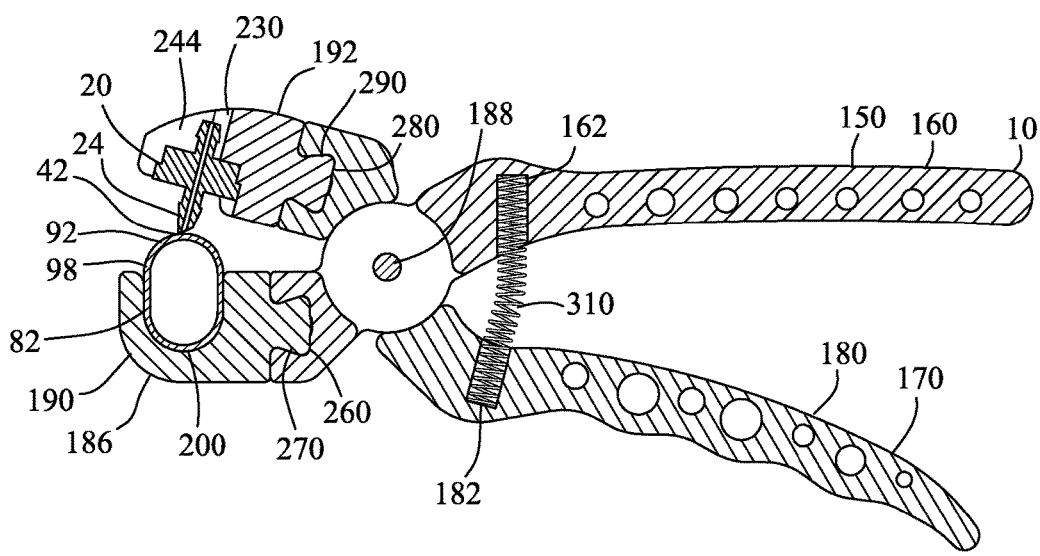
FIG. 14 is a view similar to FIG. 13, illustrating a primary handle and a secondary handle converging for generating a mechanical advantage between a primary jaw and a secondary primary jaw.
Figure 15:
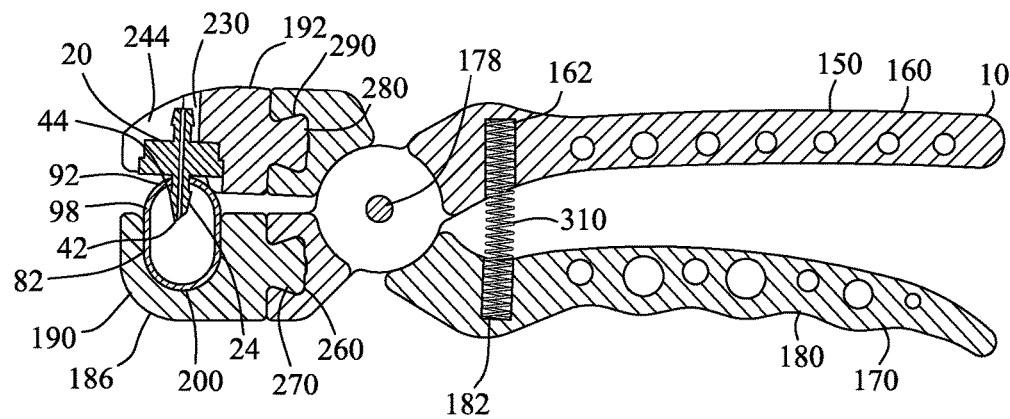
FIG. 15 is a view similar to FIG. 14, illustrating the primary jaw and the secondary jaw compressing the irrigation tubing with the irrigation emitter and piecing a barb tube through the irrigation tubing.
Figure 16:
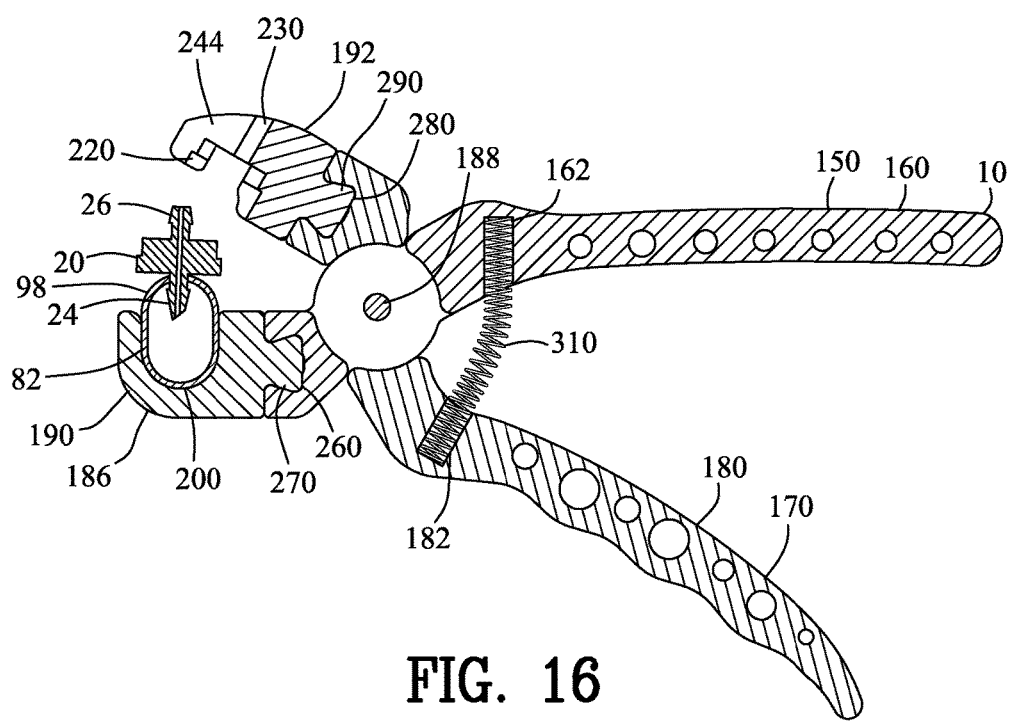
FIG. 16 is a view similar to FIG. 15, illustrating a spring repelling the primary handle and the secondary handle for disengaging the irrigation emitter from the emitter socket.
Figure 19:
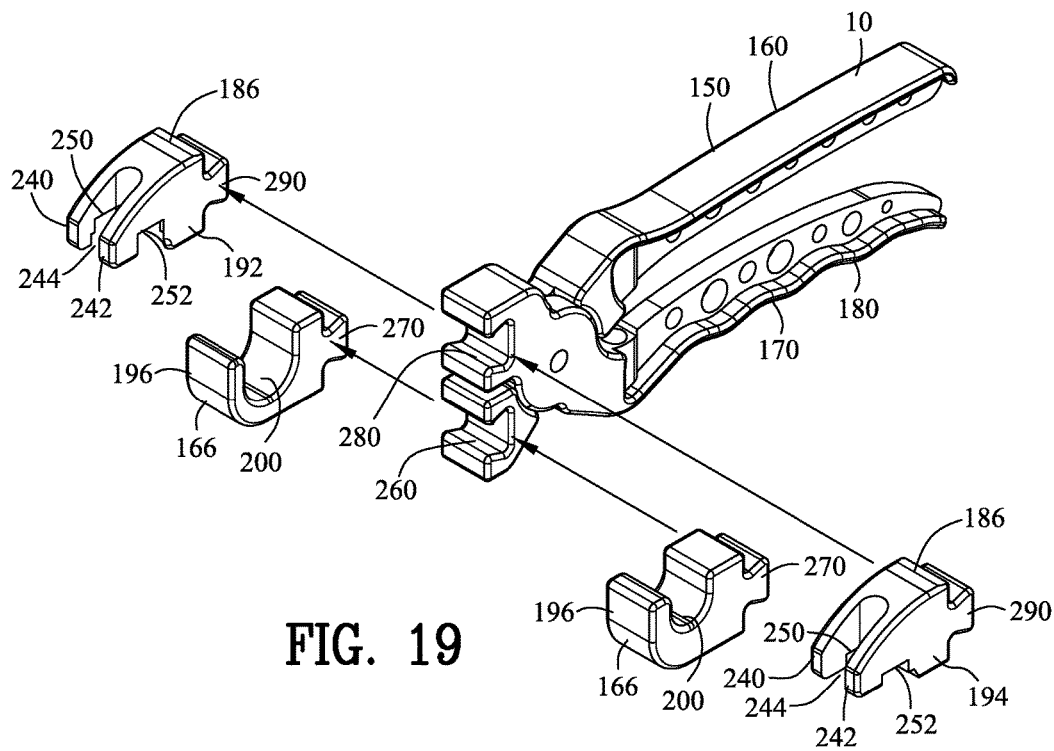
FIG. 19 is a view similar to FIG. 1, illustrating the primary jaw and the secondary jaw being removed from the primary fulcrum base and a secondary fulcrum base respectively, and replaced with an alternative primary jaw and a alternative secondary jaw.
Figure 20:
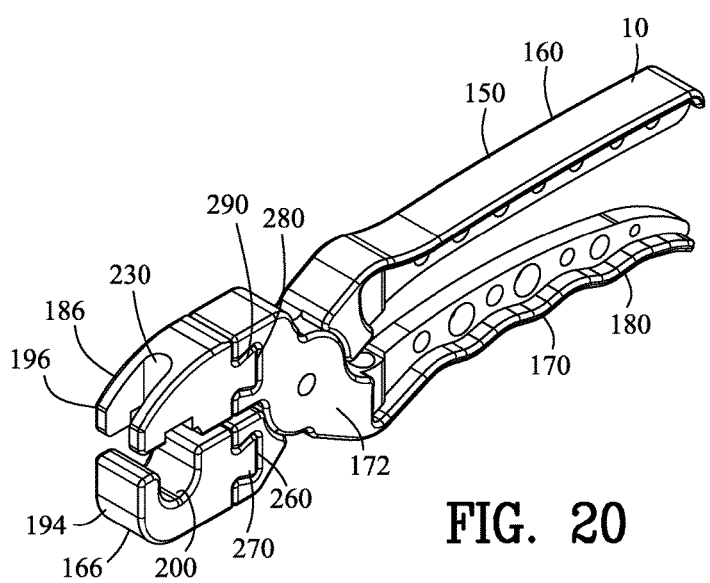
FIG. 20 is a view similar to FIG. 19, illustrating the alternative primary jaw and the alternative secondary jaw engaging the primary fulcrum base and a secondary fulcrum base respectively.
Figure 21:
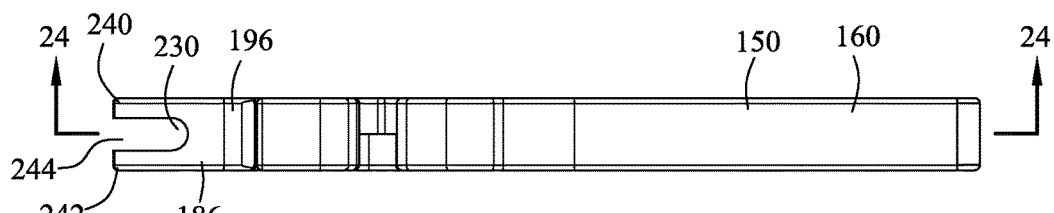
FIG. 21 is a top view of FIG. 20.
Figure 22:
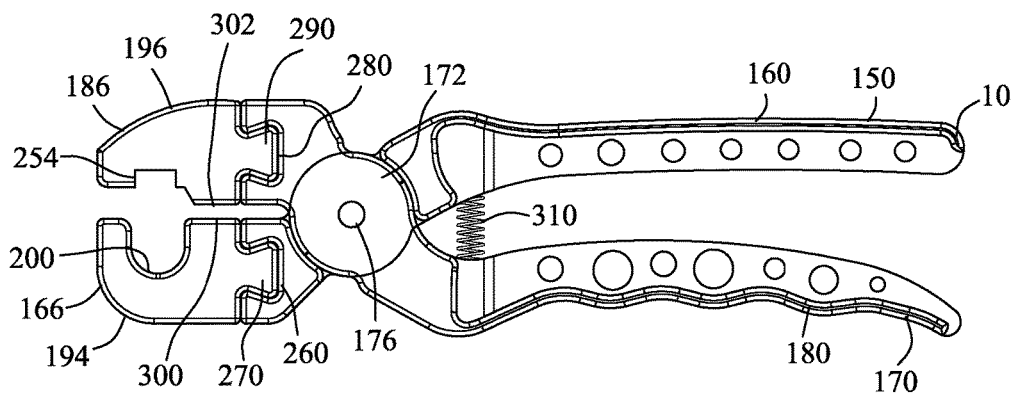
FIG. 22 is a right side view of FIG. 20.
Figure 23:
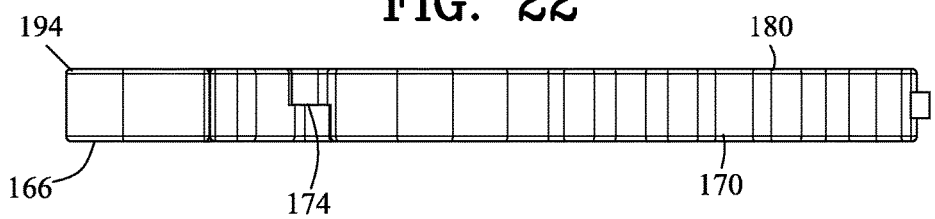
FIG. 23 is a bottom view of FIG. 20.
Figure 24:
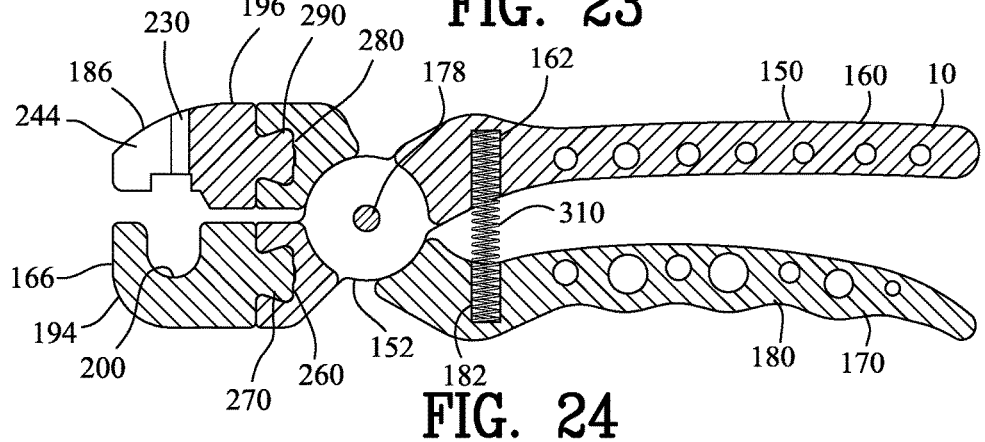
FIG. 24 is a sectional view along line 24-24 in FIG. 21.
Figure 25:
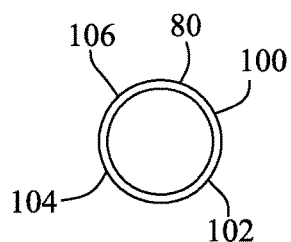
FIG. 25 is an end view of a second irrigation tubing.
Figure 26:
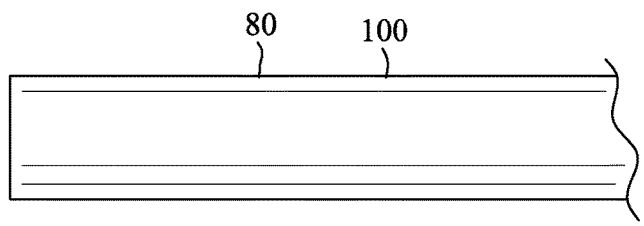
FIG. 26 is a side view of FIG. 25.
Figure 27:
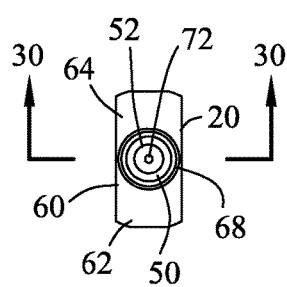
FIG. 27 is a top view of an connector irrigation emitter with micro irrigation tubing.

The emitter base 22 of FIGS. 10-18 includes an emitter base circular cross-section 30 having an emitter base diameter 32. The emitter base 22 of FIGS. 10-18 further defines an emitter base height 34 and an emitter step 38. As best shown in FIG. 12, the irrigation emitter 20 includes an emitter conduit 36. Preferably, the emitter conduit 36 may include a non-linear conduit for regulating the flow of water through the irrigation emitter 20.

Figure 30:
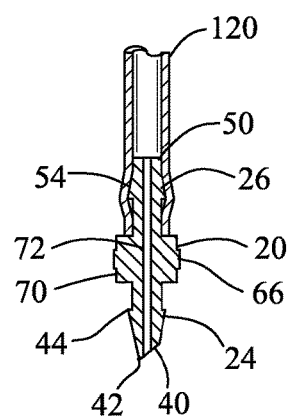
FIG. 30 is a sectional view along line 30-30 in FIG. 27.
Figure 28:
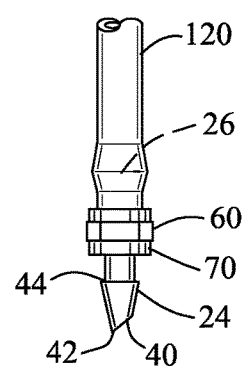
FIG. 28 is a front view of FIG. 27.
Figure 29:
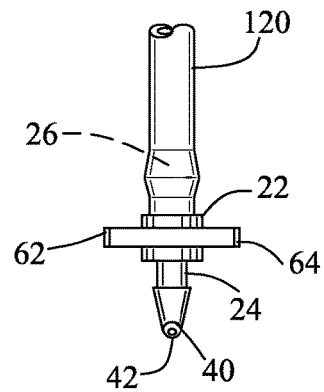
FIG. 29 is a right side view of FIG. 28.
Figure 31:
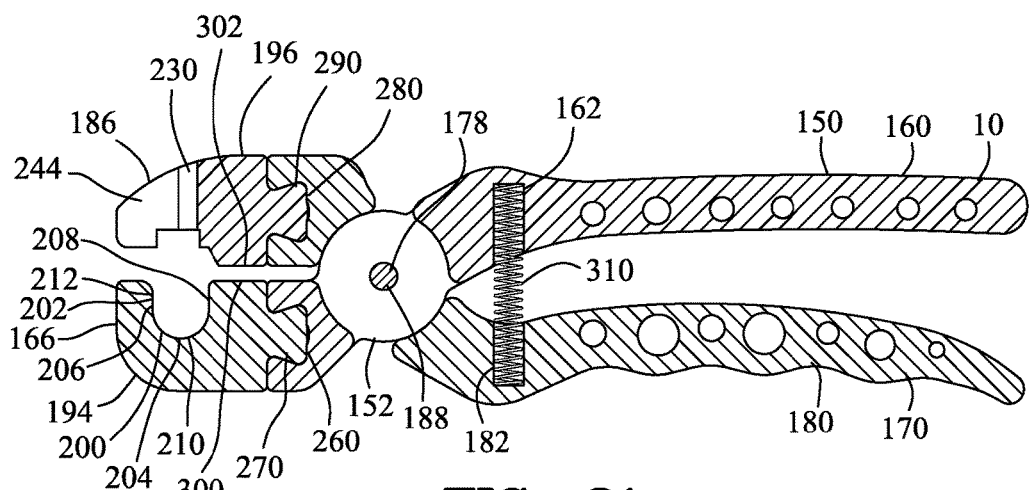
FIG. 31 is a view similar to FIG. 24 illustrating the irrigation insertion tool prepared to engage the connector irrigation emitter and second irrigation tubing.
Figure 32:
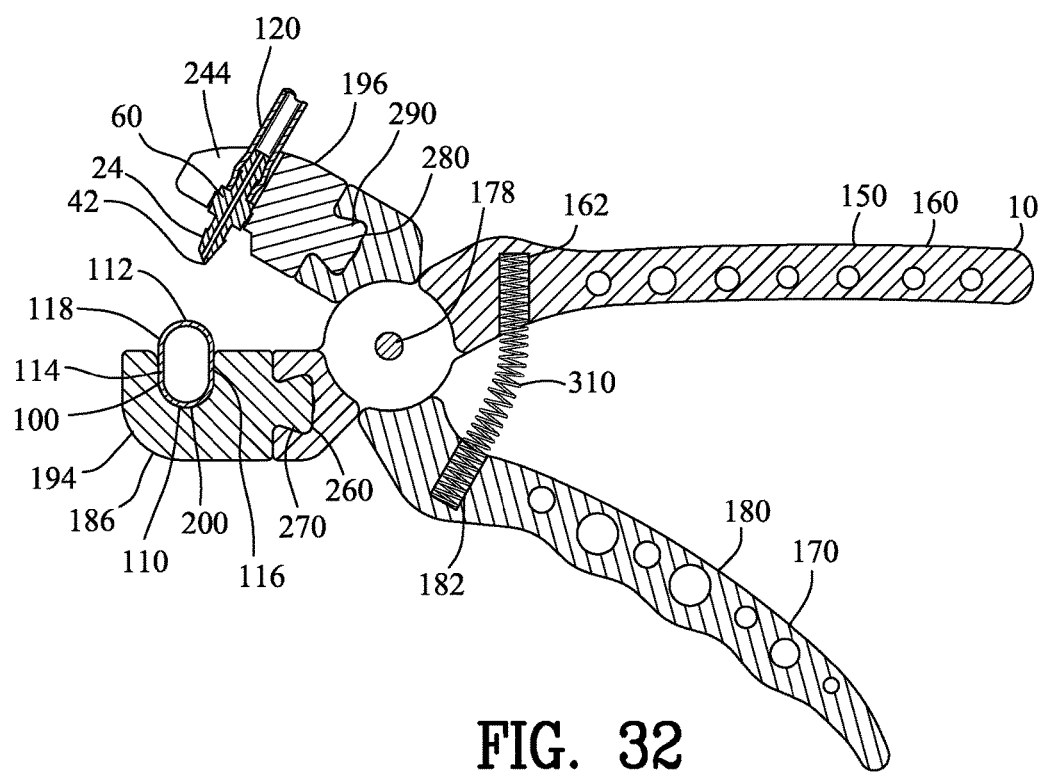
FIG. 32 is a view similar to FIG. 31, illustrating the connector irrigation emitter and second irrigation tubing engaging the irrigation insertion tool.
Figure 33:
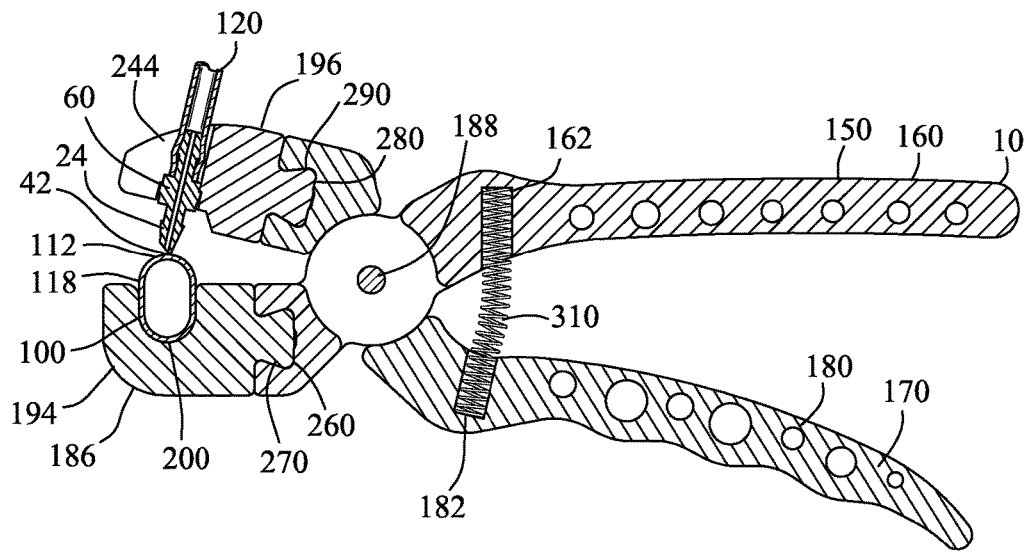
FIG. 33 is a view similar to FIG. 32, illustrating a primary handle and a secondary handle converging for generating a mechanical advantage between a primary jaw and a secondary primary jaw.
Figure 34:
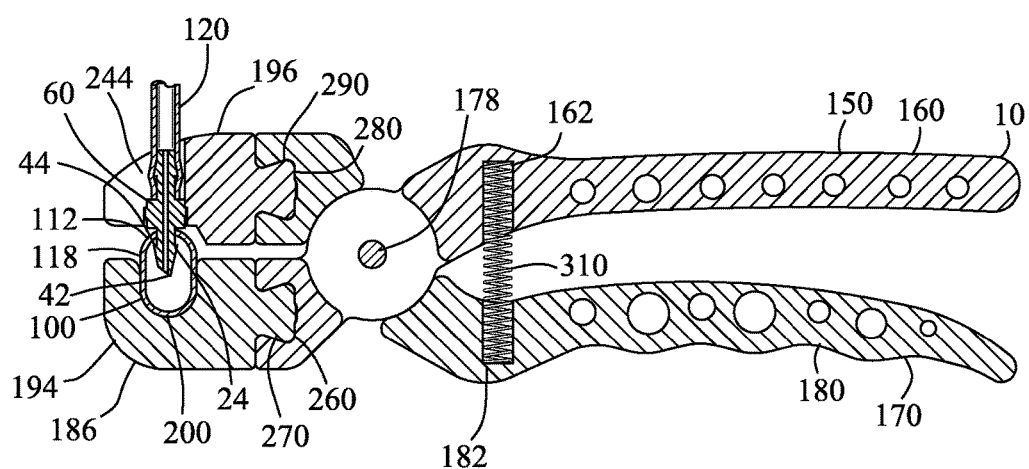
FIG. 34 is a view similar to FIG. 33, illustrating the primary jaw and the secondary jaw compressing the second irrigation tubing with the connector irrigation emitter and piecing a barb tube through the second irrigation tubing.
Figure 35:
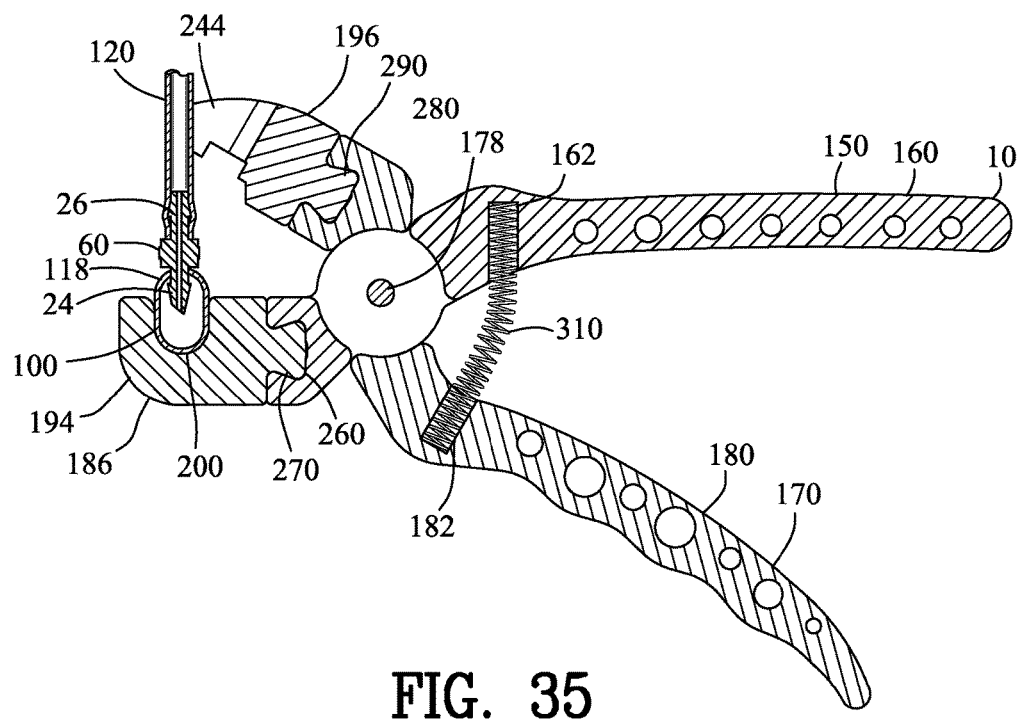
FIG. 35 is a view similar to FIG. 34, illustrating a spring repelling the primary handle and the secondary handle for disengaging the connector irrigation emitter from the emitter socket.
Figures 36, 37:
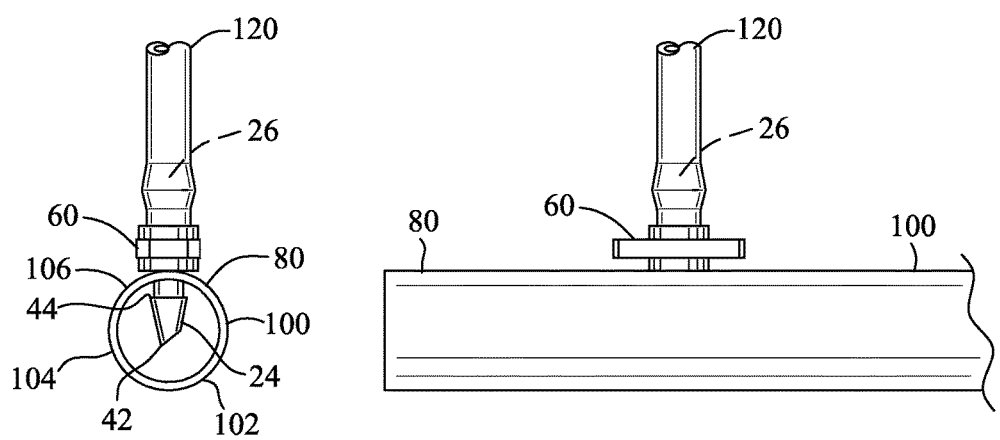
FIG. 36 is an enlarged view of a portion of FIG. 35, illustrating the connector irrigation emitter and the second irrigation tubing after being removed from the tubing channel.
FIG. 37 is a right side view of FIG. 36.
Figure 38:
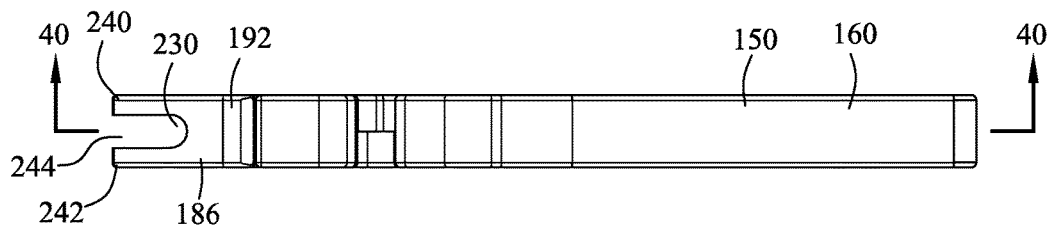
FIG. 38 is a top view of an second embodiment of the irrigation insertion tool.

The emitter base 22 of FIGS. 27-30 and 32-37 includes an emitter base circular cross-section 66 defining an emitter-based diameter 68. The emitter base 22 of FIGS. 27-30 and 32-37 further defines an emitter base height 70. As best shown in FIG. 30, the irrigation emitter 20 includes an emitter conduit 72. In addition, the emitter base 22 of FIGS. 27-30 and 32-37 includes a first emitter plate 62 and a second emitter plate 64. In addition, the connector irrigation emitter 60 may be utilized with any connector micro tubing 102. The connector micro tubing 102 may be utilized for remotely locating an irrigation emitter 20 that is distanced from the irrigation tubing 80.

As shown in FIGS. 8, 9, 13-18, 25, 26 and 32-37, the irrigation tubing 80 is utilized for delivering a flow of fluid to the irrigation emitter 20. The irrigation tubing 80 is preferably constructed from a polypropylene substance that is semi-flexible. FIGS. 8, 9 and 13-18 illustrate a first irrigation tubing 82 having a first circular cross-section 84, a first tubing diameter 86 and a first tube wall 88. FIGS. 25, 26 and 32-27 illustrate a second irrigation tubing 100 having a second circular cross-section 102, a second tubing diameter 104 and a second tube wall 106.

FIGS. 1-7, 13-16, 19-24, 31-35 and 38-40 illustrate the irrigation insertion tool 10 utilized for more easily and more efficiently coupling the irrigation emitter 20 with the irrigation tubing 80. The irrigation insertion tool 10 comprises a primary lever 150 and a secondary lever 170. The primary lever 150 includes a primary fulcrum base 152 that couples a primary handle 160 and a primary jaw 166. The secondary lever 170 includes a secondary fulcrum base 172 coupling a secondary handle 180 and a secondary jaw 186.

The primary fulcrum base 152 includes a primary fulcrum pivoting surface 154. Similarly, the secondary fulcrum base 172 includes a secondary fulcrum pivoting surface 174. The primary fulcrum pivoting surface 154 abuts the secondary fulcrum pivoting surface 174 for pivoting the primary lever 150 relative to the secondary lever 170. The primary fulcrum pivoting surface 154 and the secondary fulcrum pivoting surface 174 includes a primary fulcrum aperture 156 and a secondary fulcrum aperture 176 respectively. A couple 178 traverses the primary fulcrum aperture 156 and the secondary fulcrum aperture 176 for pivoting the primary lever 150 relative to the secondary lever 170. The couple 178 defines a fulcrum 188 relative to the primary lever 150 and the secondary lever 170. The couple 178 may include one or more screws, rivets, pins or other fastening devices.

As best shown in FIGS. 1-7, 13-16 and 19-24, 31-35 and 38-40, a tubing channel 200 is in the primary jaw 166 for receiving the irrigation tubing 80. Preferably, the tubing channel 200 defines a perpendicular orientation 202 relative to the primary lever 150. An emitter socket 220 is in the secondary jaw 186 for receiving the irrigation emitter 20. As shown in FIGS. 13-15 and 32-34, the primary handle 160 and the secondary handle 180 converge for generating a mechanical advantage between converging primary jaw 166 and secondary jaw 186. The primary jaw 166 and the secondary jaw 186 compress the irrigation tubing 80 with the irrigation emitter 20 and pierce the barb tube 24 through the tube wall 88, 106 of the irrigation tubing 80.

The tubing channel 200 defines a concave wall 204 coupling a first linear wall 206 and a second linear wall 208. The first linear wall 206 and the second linear wall 208 define a channel width 210. The channel width 210 is less than the tubing diameter 86, 104 for compressing and elongating the irrigation tubing 80. By pressing and elongating the first circular cross-section 84 and the second circular cross-section 102 of the irrigation tubing 80 is altered. More specifically, the first irrigation tubing 82 as shown in FIGS. 13-16 includes a lower concave tubing section 90, and upper concave tubing section 92, a first linear tubing section 94 and a second linear tubing section 96. The pressing and elongating of the first irrigation tubing 82 provides an elongated cross-section 98. Similarly, the second irrigation tubing 100 as shown in FIGS. 31-35 includes a lower concave tubing section 110, and upper concave tubing section 112, a first linear tubing section 114 and a second linear tubing section 116. The pressing and elongating of the second irrigation tubing 100 provides an elongated cross-section 118. The elongated cross-section 98 and the elongated cross-section 118 prevents the irrigation tubing 80 from collapsing inwardly during the barb tube 24 being pierced through the tube wall 88, 106 of the irrigation emitter 20.

In addition, the concave wall 204, the first linear wall 206 and the second linear wall 208 defining a channel height 212. The channel height 212 is greater than the tubing diameter 86, 104 for maintaining the irrigation tubing 82, 100 within the tubing channel 200 during compressing and elongating of the irrigation tubing 82, 100 by the tubing channel 200.

The primary jaw 166 includes a primary stop surface 300. The second jaw 186 includes a secondary stop surface 302. The primary stop surface 300 and the secondary stop surface 302 engage after the barb tube 24 is pierced through the tube wall 88, 106 of the irrigation tubing 80. Upon the primary stop surface 300 and the secondary stop surface 302 engaging, further compression between the primary jaw 166 and the secondary jaw 186 is terminated. The termination of the primary jaw 166 and the secondary jaw 186 assures that the irrigation tubing 80 will not be over compressed and damaged.

The emitter socket 220 includes an emitter base socket 222 having a circular cross-section defining a base socket diameter 224 and a base socket height 226. The emitter socket 220 may further include an emitter step 228 for meeting with the emitter step 38. The base socket diameter 224 is marginally greater than the emitter base diameter 32 and the base socket height 226 is marginally greater than the emitter base height 36 for rigidly securing the irrigation emitter 20 to the secondary jaw 186.

The secondary jaw may further include a first jaw arm 240 and a second jaw arm 424. The first jaw arm 240 and the second jaw arm define a jaw channel 244 there between. The jaw channel 224 intersecting the base emitter socket 222 for permitting the discharge tube 26 to traverse the jaw channel 224 after disengaging the irrigation emitter 20 from the emitter socket 220.

The emitter socket 220 may also include a discharge tube socket 230 centered with the emitter base socket 222. The discharge tube socket 230 includes a circular cross-section 232 defining a discharge tube socket diameter 234 and a discharge tube socket height 236. The discharge tube socket diameter 234 is marginally greater than the discharge tube diameter 52 and the discharge tube socket height 236 is marginally greater than the discharge tube height 54 for rigidly securing the irrigation emitter 20 to the secondary jaw 186. Preferably, the jaw channel 244 intersects the emitter socket 220 and the discharge tube socket 230 for permitting the discharge tube to traverse the jaw channel after disengaging the irrigation emitter 20 from the emitter socket 220.

In addition, as best shown in FIGS. 32-35, the jaw channel 224 and discharge tube socket 230 permit both the discharge tube 26 of the connector irrigation emitter 60 and the connector micro tubing 120 to be positioned within the discharge socket 230. The secondary jaw 186 includes a first notch 250 extending from the emitter socket 220 and a second notch 252 extending from the emitter socket 220. The first notch 250 is positioned within the first jaw arm 240 and the second notch 252 is positioned within the second jaw arm 242. The first notch 250 and the second notch 252 have a parallel orientation 254 and receiving the connector irrigation emitter 60. More specifically, the first notch 250 receives the first emitter plate 62, and the second notch 252 receives the second emitter plate 64. The dimensions of the first notch 250 and the second notch 252 are marginally greater than the first emitter plate 62 and the second in their plate 64 respectively for rigidly securing the connector irrigation emitter 60 to the secondary jaw 186.

As shown in FIGS. 1-19, the irrigation insertion tool 10 may include a first primary jaw 190 and a first secondary jaw 192. FIGS. 19-37 illustrate the irrigation insertion tool 10 including a second primary jaw 194 and a second secondary jaw 196. In order to accommodate various irrigation emitters 20 the irrigation insertion tool 10 permits the first primary jaw 190 to be removed and replaced by a second primary jaw 194. Furthermore, in order to accommodate various dimensions of irrigation tubing 80 the irrigation insertion tool 10 permits the first secondary jaw 192 to be removed and replaced by a second secondary jaw 196.

In order to facilitate the removal and replacement of the first primary jaw 190, the primary fulcrum base 152 includes a first primary couple 260. The primary jaw 166 has a second primary couple 270. The first primary couple 260 may include a female dove tail 262 and the second primary couple 270 may include a male dove tail 272. The first primary couple 260 engages with the second primary couple 270 for coupling the primary fulcrum base 152 with the primary jaw 166. The first primary couple 260 disengages with the second primary couple 270 for decoupling the primary fulcrum base 152 with the primary jaw 166. The female dove tail 262 may include a locking recess 264. The male dove tail 274 may include a locking tab 274. The locking tab 274 engages with the locking recess 264 to prevent inadvertent removal of the primary fulcrum base 152 with the primary jaw 166.

In order to facilitate the removal and replacement of the first secondary jaw 192, the secondary fulcrum base 172 includes a first secondary couple 280. The secondary jaw 186 has a second secondary couple 290. The first secondary couple 280 engages with the second secondary couple 290 for coupling the secondary fulcrum base 172 with the secondary jaw 186. The first secondary couple 280 disengages with the second secondary couple 290 for decoupling the secondary fulcrum base 172 with the secondary jaw 186. The first secondary couple 280 may includes a female dove tail 282. The second secondary couple 290 includes a male dove tail 292.

The female dove tail 282 includes a locking recess 284. The male dove tail 292 includes a locking tab 294. The locking tab 294 engages with the locking recess 284 to prevent inadvertent removal of the secondary fulcrum base 172 with the secondary jaw 186.

Figure 39:
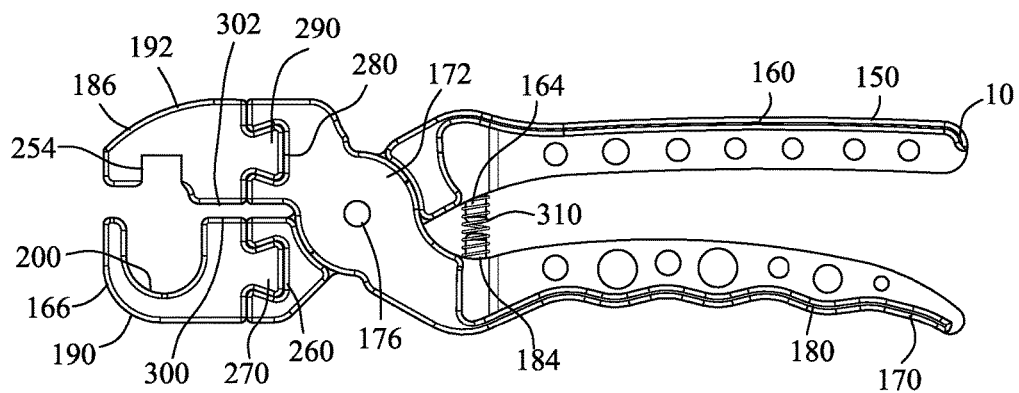
FIG. 39 is a front view of FIG. 38.
Figure 40:
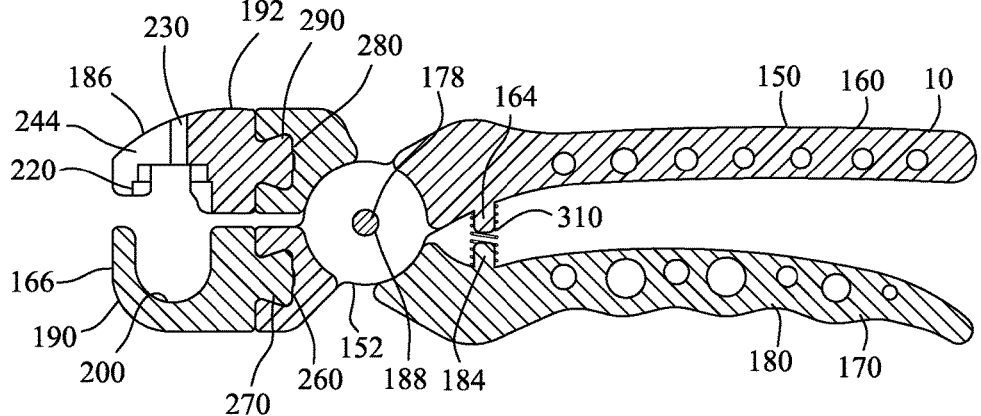
FIG. 40 is a sectional view along line 40-40 in FIG. 38.

As best shown in FIGS. 6, 13-16, 24, 31-35 and 40, a spring 310 is coupled to the primary handle 160 and the secondary handle 180 for repelling the primary handle 160 and the secondary handle 180. More specifically, the primary handle 160 may include a primary spring aperture 162 and the secondary handle 180 may include a secondary spring aperture 182. The spring 310 is coupled by inserting the spring 310 into the primary spring aperture 162 and the secondary spring aperture 182. Alternatively, as shown in FIGS. 39 and 40, the primary handle 160 may include a primary spring nipple 164 and the secondary handle 180 may include a secondary spring nipple 184. The spring 310 is coupled by positioning the spring 310 over the primary spring nipple 164 and the secondary spring nipple 184

As shown in FIGS. 13-18 and 31-37, the subject invention also incorporates a method for inserting the irrigation emitter 20 into the irrigation tubing 80. The method comprising the steps of inputting the irrigation tubing 80 within the tubing channel 200 of a primary jaw 166. The irrigation emitter 20 is inputted within an emitter socket 220 of a secondary jaw 186. The primary handle 160 and a secondary handle 180 converge for generating a mechanical advantage between converging primary jaw 166 and secondary jaw 186. The irrigation tubing 80 is compressed with the irrigation emitter 20 and pierces the barb tube 24 through the irrigation tubing 80.

A further step includes repelling the primary handle 160 and the secondary handle 180 for disengaging the irrigation emitter 20 from the emitter socket 220. Thereafter removing the irrigation tubing 80 from the tubing channel 200.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An irrigation insertion tool for inserting an irrigation emitter into an irrigation tubing, the irrigation emitter having an emitter base coupling a barb tube and a discharge tube, the irrigation tubing having a circular cross-section defining a tubing diameter, the irrigation insertion tool comprising:
   a primary lever including a primary fulcrum base coupling a primary handle and a primary jaw;
   a secondary lever including a secondary fulcrum base coupling a secondary handle and a secondary jaw;
   a couple joining said primary fulcrum base and said secondary fulcrum base for defining a fulcrum;
   a tubing channel in said primary jaw for receiving the irrigation tubing;
   an emitter socket in said secondary jaw for receiving the irrigation emitter;
   said primary handle and said secondary handle converging for generating a mechanical advantage between converging said primary jaw and said secondary jaw;
   said primary jaw and said secondary jaw compressing the irrigation tubing with the irrigation emitter and piecing the barb tube through the irrigation tubing;
   said emitter socket includes an emitter base socket;
   said emitter base socket defining a circular cross-section defining a base socket diameter and a base socket height; and
   said base socket diameter marginally greater than the emitter base and said base socket height marginally greater than the emitter base for rigidly securing the irrigation emitter to said secondary jaw.

2. An irrigation insertion tool as set forth in claim 1, wherein said tubing channel defines a perpendicular orientation relative to said primary lever.

3. An irrigation insertion tool as set forth in claim 1, wherein said tubing channel defines a concave wall coupling a first linear wall and a second linear wall;
   said first linear wall and said second linear wall defining a channel width; and
   said channel width being less than the tubing diameter for compressing and elongating the irrigation tubing and preventing the irrigation tubing from collapsing inwardly during the barb tube being pierced through the irrigation emitter.

4. An irrigation insertion tool as set forth in claim 3, wherein said concave wall, said first linear wall and said second linear wall defining a channel height; and
   said channel height being greater than the tubing diameter for maintaining the irrigation tubing within said tubing channel during compressing and elongating of the irrigation tubing by said tubing channel.

5. An irrigation insertion tool as set forth in claim 1, wherein said primary jaw includes a primary stop surface;
   said second jaw includes a secondary stop surface; and
   said primary stop surface and said secondary stop surface engaging for terminating displacement of said primary jaw relative to said secondary primary jaw and further compressing the irrigation tubing with the irrigation emitter.

6. An irrigation insertion tool as set forth in claim 1, wherein said secondary jaw includes a first jaw arm and a second jaw arm;
   a jaw channel between said first jaw arm and said second jaw arm; and
   said jaw channel intersecting said base emitter socket for permitting the discharge tube to traverse said jaw channel after disengaging the irrigation emitter from said emitter socket.

7. An irrigation insertion tool as set forth in claim 1, wherein said emitter socket includes a discharge tube socket centered with said emitter base socket;
   said discharge tube socket defining a circular cross-section defining a discharge tube socket diameter and a discharge tube socket height; and
   said discharge tube socket diameter marginally greater than the discharge tube and said discharge tube socket height marginally greater than the discharge tube for rigidly securing the irrigation emitter to said secondary jaw.

8. An irrigation insertion tool as set forth in claim 7, wherein said secondary jaw includes a first jaw arm and a second jaw arm;
   a jaw channel between said first jaw arm and said second jaw arm; and
   said jaw channel intersecting said emitter socket and said discharge tube socket for permitting the discharge tube to traverse said jaw channel after disengaging the irrigation emitter from said emitter socket.

9. An irrigation insertion tool as set forth in claim 1, wherein said secondary jaw includes a first notch extending from said emitter socket;
   a second notch extending from said emitter socket; and
   said first notch and said second notch having a parallel orientation and receiving the irrigation emitter.

10. An irrigation insertion tool as set forth in claim 1, wherein said primary fulcrum base including a first primary couple;
    said primary jaw having a second primary couple;
    said first primary couple engaging with said second primary couple for coupling said primary fulcrum base with said primary jaw; and
    said first primary couple disengaging with said second primary couple for decoupling said primary fulcrum base with said primary jaw.

11. An irrigation insertion tool as set forth in claim 10, wherein said first primary couple includes a female dove tail; and
    said second primary couple includes a male dove tail.

12. An irrigation insertion tool as set forth in claim 11, wherein said female dove tail includes a locking recess;
    said male dove tail includes a locking tab; and
    said locking tab engaging with said locking recess to prevent inadvertent removal of said primary fulcrum base with said primary jaw.

13. An irrigation insertion tool as set forth in claim 1, wherein said secondary fulcrum base including a first secondary couple;
    said secondary jaw having a second secondary couple;
    said first secondary couple engaging with said second secondary couple for coupling said secondary fulcrum base with said secondary jaw; and
    said first secondary couple disengaging with said second secondary couple for decoupling said secondary fulcrum base with said secondary jaw.

14. An irrigation insertion tool as set forth in claim 13, wherein said first secondary couple includes a female dove tail; and
    said second secondary couple includes a male dove tail.

15. An irrigation insertion tool as set forth in claim 14, wherein said female dove tail includes a locking recess;
    said male dove tail includes a locking tab; and
    said locking tab engaging with said locking recess to prevent inadvertent removal of said secondary fulcrum base with said secondary jaw.

16. An irrigation insertion tool as set forth in claim 1, further including a spring coupled to said primary handle and said secondary handle for repelling said primary handle and said secondary handle.

17. An irrigation insertion tool for inserting an irrigation emitter into an irrigation tubing, the irrigation emitter having an emitter base coupling a barb tube and a discharge tube, the irrigation tubing having a circular cross-section defining a tubing diameter, the irrigation insertion tool comprising:
- a primary lever including a primary fulcrum base coupling a primary handle and a primary jaw;
- a secondary lever including a secondary fulcrum base coupling a secondary handle and a secondary jaw;
- a couple joining said primary fulcrum base and said secondary fulcrum base for defining a fulcrum;
- a tubing channel in said primary jaw for receiving the irrigation tubing;
- an emitter socket in said secondary jaw for receiving the irrigation emitter;
- said primary handle and said secondary handle converging for generating a mechanical advantage between converging said primary jaw and said secondary jaw;
- said primary jaw and said secondary jaw compressing the irrigation tubing with the irrigation emitter and piecing the barb tube through the irrigation tubing;
- said secondary law includes a first notch extending from said emitter socket;
- a second notch extending from said emitter socket; and
- said first notch and said second notch having a parallel orientation and receiving the irrigation emitter.

18. An irrigation insertion tool for inserting an irrigation emitter into an irrigation tubing, the irrigation emitter having an emitter base coupling a barb tube and a discharge tube, the irrigation tubing having a circular cross-section defining a tubing diameter, the irrigation insertion tool comprising:
- a primary lever including a primary fulcrum base coupling a primary handle and a primary jaw;
- a secondary lever including a secondary fulcrum base coupling a secondary handle and a secondary jaw;
- a couple joining said primary fulcrum base and said secondary fulcrum base for defining a fulcrum;
- a tubing channel in said primary jaw for receiving the irrigation tubing;
- an emitter socket in said secondary jaw for receiving the irrigation emitter;
- said primary handle and said secondary handle converging for generating a mechanical advantage between converging said primary jaw and said secondary jaw;
- said primary jaw and said secondary jaw compressing the irrigation tubing with the irrigation emitter and piecing the barb tube through the irrigation tubing;
- said primary fulcrum base including a first primary couple;
- said primary jaw having a second primary couple;
- said first primary couple engaging with said second primary couple for coupling said primary fulcrum base with said primary jaw; and
- said first primary couple disengaging with said second primary couple for decoupling said primary fulcrum base with said primary jaw.

19. An irrigation insertion tool for inserting an irrigation emitter into an irrigation tubing, the irrigation emitter having an emitter base coupling a barb tube and a discharge tube, the irrigation tubing having a circular cross-section defining a tubing diameter, the irrigation insertion tool comprising:
- a primary lever including a primary fulcrum base coupling a primary handle and a primary jaw;
- a secondary lever including a secondary fulcrum base coupling a secondary handle and a secondary jaw;
- a couple joining said primary fulcrum base and said secondary fulcrum base for defining a fulcrum;
- a tubing channel in said primary jaw for receiving the irrigation tubing;
- an emitter socket in said secondary jaw for receiving the irrigation emitter;
- said primary handle and said secondary handle converging for generating a mechanical advantage between converging said primary jaw and said secondary jaw;
- said primary jaw and said secondary jaw compressing the irrigation tubing with the irrigation emitter and piecing the barb tube through the irrigation tubing;
- said secondary fulcrum base including a first secondary couple;
- said secondary jaw having a second secondary couple;
- said first secondary couple engaging with said second secondary couple for coupling said secondary fulcrum base with said secondary jaw; and
- said first secondary couple disengaging with said second secondary couple for decoupling said secondary fulcrum base with said secondary jaw.

* * * * *